United States Patent
Liberman et al.

(10) Patent No.: US 11,565,199 B2
(45) Date of Patent: *Jan. 31, 2023

(54) INTEGRATED UNIT FOR INTAKE AND PRETREATMENT WITH LOCAL BACKWASHING

(71) Applicant: IDE Water Technologies Ltd., Kadima (IL)

(72) Inventors: Boris Liberman, Even Yehuda (IL); Vitaly Levitin, Haifa (IL); Gal Greenberg, Ensarid (IL)

(73) Assignee: IDE Water Technologies Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 16/093,924

(22) PCT Filed: Apr. 14, 2017

(86) PCT No.: PCT/IB2017/052165
§ 371 (c)(1),
(2) Date: Oct. 15, 2018

(87) PCT Pub. No.: WO2017/179019
PCT Pub. Date: Oct. 19, 2017

(65) Prior Publication Data
US 2020/0054970 A1 Feb. 20, 2020

(30) Foreign Application Priority Data
Apr. 14, 2016 (GB) .................................. 1606516

(51) Int. Cl.
*B01D 24/46* (2006.01)
*B01D 24/22* (2006.01)
*C02F 1/00* (2006.01)

(52) U.S. Cl.
CPC ......... *B01D 24/4636* (2013.01); *B01D 24/22* (2013.01); *B01D 24/4626* (2013.01);
(Continued)

(58) Field of Classification Search
None
See application file for complete search history.

(56) References Cited

U.S. PATENT DOCUMENTS 3,630,364 A * 12/1971 Johnston ................ A01K 63/04
210/167.23
4,094,788 A * 6/1978 Dockery ................ A01K 63/04
210/167.21
(Continued)

FOREIGN PATENT DOCUMENTS

DE 4112237 C1 8/1992
GB 2493052 A 1/2013

OTHER PUBLICATIONS

Search and Examination Report for GB1606516.1 dated May 3, 2016.
International Search Report dated Oct. 17, 2017 for PCT/IB2017/052165.

*Primary Examiner* — Robert J Popovics
(74) *Attorney, Agent, or Firm* — Fresh IP PLC; Clifford D. Hyra; Aubrey Y. Chen

(57) ABSTRACT

Locally backwashing portions of filter media allows a simple and effective design of intake and pretreatment units, as well as their integration. An enclosure is used to limit portions of filter media and backwash them locally by suction, utilizing filtered water from adjacent filter media as the back wash water. Wastewater is produced at small amounts that allows efficient sludge treatment. This design enables water pretreatment at the intake unit, simplifying (Continued)

overall plant design and preventing damage to organisms living outside the intake unit.

13 Claims, 11 Drawing Sheets

(52) U.S. Cl.
CPC .......... *B01D 24/4689* (2013.01); *C02F 1/004* (2013.01); *C02F 2303/16* (2013.01)

(56) References Cited

U.S. PATENT DOCUMENTS

| | | | |
|---|---|---|---|
| 4,486,307 A | | 12/1984 | Weiler |
| 5,279,730 A | * | 1/1994 | Chen .................... A01K 63/006 |
| | | | 119/264 |
| 5,655,245 A | * | 8/1997 | Bunch .................. A01K 63/006 |
| | | | 119/232 |
| 2015/0034569 A1 | * | 2/2015 | Liberman ............ B01D 24/205 |
| | | | 210/798 |
| 2020/0054970 A1 | * | 2/2020 | Liberman .......... B01D 24/4636 |

* cited by examiner

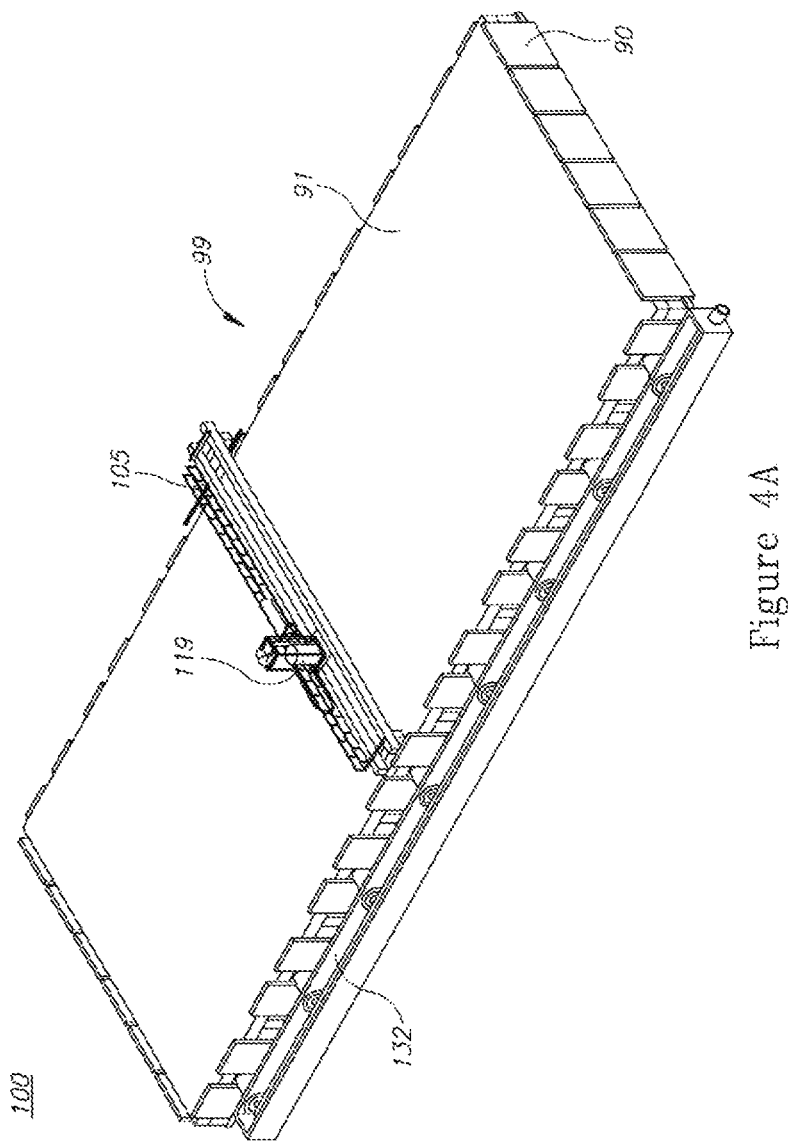

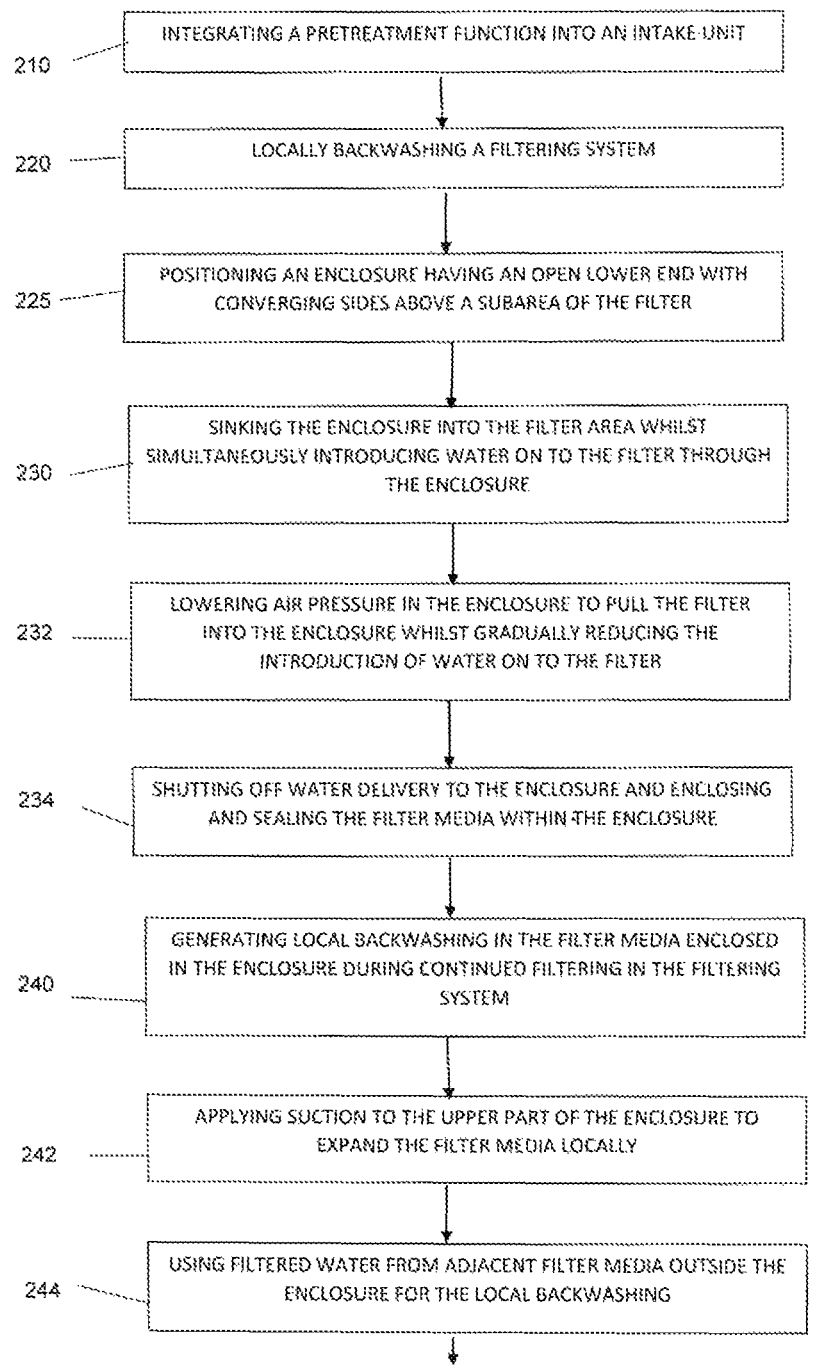

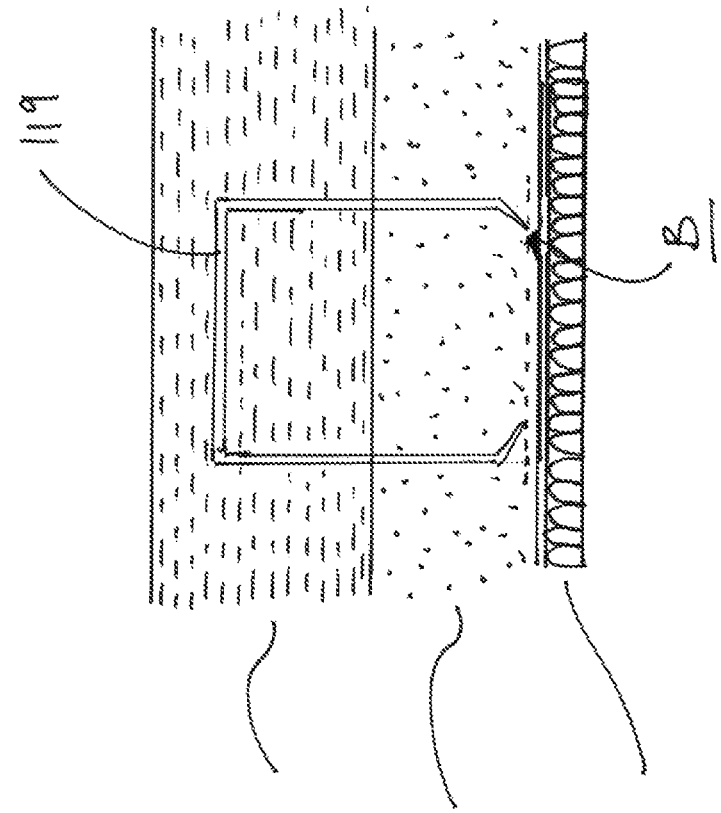
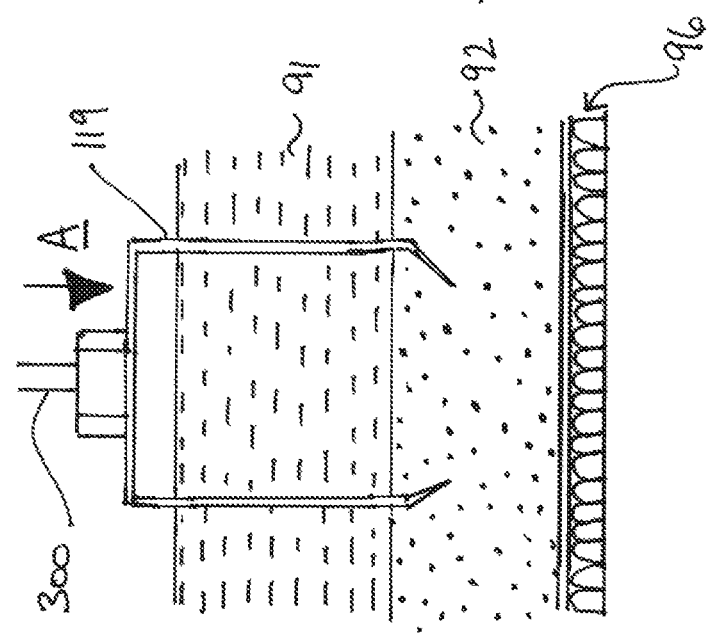

INTEGRATED UNIT FOR INTAKE AND PRETREATMENT WITH LOCAL BACKWASHING

TECHNICAL FIELD

The present invention relates to the field of water treatment, and more particularly, to a filtering system.

BACKGROUND

Water treatment systems such as seawater desalination facilities and osmotic power plants (facilities that generate energy from a difference in osmotic pressures of e.g. seawater versus river water) include an intake unit for delivering water from its source (e.g. sea or river) to the system, and a pretreatment unit for removing floating and dissolved material from the delivered water, in order to prepare the water for the main membrane process.

Two types of intake units are open intakes and infiltration intakes (or infiltration galleries). Open intakes draw water via piping directly from the source. Open intakes typically employ screen meshes to filter out large debris and prevent fish or other marine life from being drawn into the pumps. However, millions of fish and other small marine organisms, with a width of under 2 cm are sucked into the piping, leading to considerable damage, both to the environment and to facilities. Damage is inflicted on both large aquatic organisms such as fish or crabs that are trapped against the intake screens and drown or suffocate, and on small marine organisms such as fish, fish eggs, larvae or plankton that is drawn into the intake system and is killed by the plant equipment.

Infiltration intakes, or galleries, are built in the seabed by the installation of horizontal drain systems. The drain system is placed in the natural filtration media sand, and the seawater is slowly filtered by the sand. This media is naturally cleaned by waves and storms. Horizontal drain systems deliver water to the pumping station located on the seashore. Infiltration galleries, while protecting the marine environment, can only be installed in areas with naturally occurring sands. Another major limitation is that these systems clog over time and it is highly difficult, or in some cases impossible, to clean them. Clogged media reduces the throughput through the system by two orders of magnitude (e.g. from 10 to 0.1 m3/hr).

Pretreatment units employ a layer of filter media supported by a drainage layer. Water is introduced above the filter media, and is pretreated by flowing through the filter media which removes floating and dissolved material therefrom. The filter media is gradually clogged by the removed material, and periodical global backwashing is used to clean the filter media. Global back washing produces huge amounts of wastewater which leads to environmental and technical problems. The backwashing process also involves interrupting the operation of the filter, and this is a major drawback too.

Such a global backwashing system according to the prior art is illustrated in FIG. 1A. FIG. 1A illustrates a prior art filter cleaning method for back washing a filter 90 that is used to filter water 91 through filter media 92 into a drainage layer 96 (under-drain) that supports filter media 92. The filter cleaning method uses an external source of backwash water that is pumped throughout the whole filter 90 to backwash the filter globally (see arrows). The backwash water is then removed gravitationally through a discharge channel 132. The large volume of backwash water requires operation of the filter with a high level of water 91 above filter media 92 (denoted in FIG. 1A by H) to allow for expansion of the filter media, during which sludge is released from the filter media particles. The necessarily large water head has severe constructional implications, as the substrate must support the large pressures. Hence, prior art backwashing systems suffer from a severe limitation. Clearly, this method of backwashing is not applicable to infiltration intakes as they are open to the water source (such as a sea or a river) and contamination of the source with the backwash water is hardly acceptable.

U.S. Pat. No. 4,486,307 (Weiler) describes a filter apparatus having filter bed back-washing means comprising a raisable and lowerable suction bell, the side walls of which define division walls to compart the respective partial volume of the filter bed to be cleaned. The suction bell is mounted on a bridge and the bell is raised and lowered by a lifting device. The bell is connected to a suction pump mounted on the bridge. In order to clean the filter bed of suspended matter filtered out of the crude water to be purified, the suction bell is lowered into an operative position. In order to facilitate the penetration of the lower edges of the side walls of the bell, the walls are provided with sharp stabbing edges and a vibrator is arranged on the top side of the suction bell. The suction action sucks water out of the filtrate chamber to make the bottom permeable to liquids. As the partial volume of the filter bed located in the suction bell is washed, the sand of the filter bed is loosened and eddied whereby the suspended matter retained in the respective partial volume is loosened and exhausted by the suction action of the pump.

U.S. Pat. No. 4,988,439 (Medders) relates to liquid filtration systems having a travelling bridge-type cleaning apparatus for sequentially cleaning a plurality of suspended solids filter units. The carriage means carries a hood assembly enclosing air scour means and liquid backwash means, the hood assembly being provided with sealing means to establish a substantially air and water tight seal between the hood and a filter cell.

While these systems are satisfactory, backwashing of a sand bed used as the filter media suffers for the severe drawback of obtaining sufficient penetration of the compacted sand bed to obtain adequate filtering of the water through the filter media.

It is an object of the present invention to provide an improved method and apparatus for backwashing a filtering system that aims to overcome, or at least alleviate, the abovementioned drawbacks.

BRIEF SUMMARY

A first aspect of the present invention provides a local backwashing apparatus for a filtering system comprising:
  an enclosure having an open lower end for positioning above a surface of filter medial of the filtering system, the filter media supported by a drainage layer;
  a pneumatic system in fluid communication with an upper part of the enclosure and configured to determine an air pressure in an upper part;
  a pipe system connecting the upper part of the enclosure with the pneumatic system and with a discharge structure; and
  a control unit connected to the pneumatic system and configured to conduct local backwashing of consecutive partial volumes of the filter media by sinking the enclosure into the filter media until the enclosure is supported on the drainage layer by reducing the air pressure in the upper part of the enclosure through the pneumatic system once the open lower end of the enclosure is immersed in filter media, to enclose the partial volume of filter media within the enclosure and generating local backwashing of the partial volume of the filter media enclosed in the enclosure, during continued operation of global filtering through filter media outside the enclosure in the filtering system, by generating suction through the pneumatic system that initiates a water flow from the upper part of the enclosure through the pipe system to the discharge structure, wherein the water flow introduces into the lower end of the enclosed partial volume of filter media filtered water from the drainage layer which expands the enclosed filter media and releases sludge therefrom the water flow that flows to the discharge structure; and raising the enclosure above the surface of the filter media to release the backwashed volume of filter media, by injecting air and increasing the air pressure in the upper part of the enclosure through the pneumatic system to float the enclosure above the filter media;

characterized in that the enclosure comprises side walls with a roof, the free ends of the side walls forming the open lower end of the enclosure, the free ends converging to provide an open lower end with a smaller cross-sectional area than the upper part of the enclosure.

According to a second aspect of the present invention there is provides a local backwashing apparatus for a filtering system comprising:

an enclosure having an open lower end for positioning above a surface of filter medial of the filtering system, the filter media supported by a drainage layer;

a pneumatic system in fluid communication with an upper part of the enclosure and configured to determine an air pressure in an upper part;

a pipe system connecting the upper part of the enclosure with the pneumatic system and with a discharge structure; and a control unit connected to the pneumatic system and configured to conduct local backwashing of consecutive partial volumes of the filter media by sinking the enclosure into the filter media until the enclosure is supported on the drainage layer by reducing the air pressure in the upper part of the enclosure through the pneumatic system once the open lower end of the enclosure is immersed in filter media, to enclose the partial volume of filter media within the enclosure and generating local backwashing of the partial volume of the filter media enclosed in the enclosure, during continued operation of global filtering through filter media outside the enclosure in the filtering system, by generating suction through the pneumatic system that initiates a water flow from the upper part of the enclosure through the pipe system to the discharge structure, wherein the water flow introduces into the lower end of the enclosed partial volume of filter media filtered water from the drainage layer which expands the enclosed filter media and releases sludge therefrom the water flow that flows to the discharge structure; and raising the enclosure above the surface of the filter media to release the backwashed volume of filter media, by injecting air and increasing the air pressure in the upper part of the enclosure through the pneumatic system to float the enclosure above the filter media;

characterized in that the enclosure is provided with a water inlet for selective delivery of water from outside the enclosure to within the enclosure during sinking of the enclosure into the filter media.

Preferably, the water inlet is provided with a valve which allows a controlled amount of water to enter the enclosure during sinking of the enclosure into the filter media. More preferably, the water inlet is gradually closed as suction is generated by the pneumatic system to initiate water flow through the enclosure from the filter media.

According to a third aspect of the present invention there is provides a local backwashing apparatus for a filtering system comprising:

an enclosure having an open lower end for positioning above a surface of filter medial of the filtering system, the filter media supported by a drainage layer;

a pneumatic system in fluid communication with an upper part of the enclosure and configured to determine an air pressure in an upper part;

a pipe system connecting the upper part of the enclosure with the pneumatic system and with a discharge structure; and a control unit connected to the pneumatic system and configured to conduct local backwashing of consecutive partial volumes of the filter media by sinking the enclosure into the filter media until the enclosure is supported on the drainage layer by reducing the air pressure in the upper part of the enclosure through the pneumatic system once the open lower end of the enclosure is immersed in filter media, to enclose the partial volume of filter media within the enclosure and generating local backwashing of the partial volume of the filter media enclosed in the enclosure, during continued operation of global filtering through filter media outside the enclosure in the filtering system, by generating suction through the pneumatic system that initiates a water flow from the upper part of the enclosure through the pipe system to the discharge structure, wherein the water flow introduces into the lower end of the enclosed partial volume of filter media filtered water from the drainage layer which expands the enclosed filter media and releases sludge therefrom the water flow that flows to the discharge structure; and raising the enclosure above the surface of the filter media to release the backwashed volume of filter media, by injecting air and increasing the air pressure in the upper part of the enclosure through the pneumatic system to float the enclosure above the filter media;

characterized in that the enclosure is connected to a mechanical member configured to forcibly drive the enclosure into the filter media and release said force prior to contact of the lower end of the enclosure with the drainage layer, the lower end of the enclosure being brought into contact with the drainage layer through a pressure differential between the interior and exterior of the enclosure.

Any appropriate mechanical member may forcibly drive the enclosure through the filter media, such as a piston. The mechanical member preferably drives the enclosure through 95-99% of the filter media prior to its release. A distance of 1-10 cm is preferably provided between the lower end of the enclosure and the drainage layer for movement of the enclosure by means of the pressure differential.

It is to be appreciated that the apparatus of the present invention preferably includes the features of the first, second and third aspects of the present invention.

The apparatus preferably includes a supporting structure movably supporting the enclosure, the supporting structure configured to position the enclosure at specified spots on the surface of the filter media. The supporting structure may be at least one a fixed bridge, a floating bridge, a rotating bridge or a crane.

The open lower end of the enclosure preferably has an area between 0.5 m$^2$ and 15 m$^2$, preferably with the main body of the enclosure being at least 10% greater than this area, preferably more than 25%.

The filtering system maybe elongated with the enclosure spanning a width of the filtering system.

The control unit is preferably arranged to sequentially backwash a whole volume of the filter media at a frequency of between five times a day and once in three months.

Preferably, a height of the enclosure is larger than a height of the water above the filter media in respect to the drainage layer.

A further aspect of the present invention provides a method of backwashing a filtering system having a layer of filter media supported by a drainage layer. The method comprises: sequentially backwashing partial volumes of the filter media by (i) driving the enclosure into the filter media until the enclosure is above the drainage layer by mechanical forcing the enclosure through the media (ii) reducing the air pressure in an upper part of the enclosure once the open lower end of the enclosure is immersed in filter media, to enclose the partial volume of filter media within the enclosure, (iii) allowing the enclosure to come into contact with the drainage layer by a pressure differential between an interior and exterior of the enclosure (iv) generating local backwashing of the partial volume of the filter media enclosed in the enclosure, during continued operation of global filtering through filter media outside the enclosure in the filtering system, by generating suction in the upper part of the enclosure that initiates a water flow from the upper part of the enclosure through the pipe system to the discharge structure, wherein the water flow introduces into the lower end of the enclosed partial volume of filter media filtered water from the drainage layer which expands the enclosed filter media and releases sludge therefrom to the water flow, and (v) raising the enclosure above the surface of the filter media to release the backwashed enclosed volume of filter media, by injecting air and increasing air pressure in the upper part of the enclosure to float the enclosure above the filter media.

Alternatively, or additionally, the method may comprise (i) sinking the enclosure into the filter media whilst simultaneously delivering water into the enclosure (ii) reducing the air pressure in an upper part of the enclosure once the open lower end of the enclosure is immersed in filter media, to enclose the partial volume of filter media within the enclosure, (iii) reducing and then ceasing delivering water into the enclosure (iv) generating local backwashing of the partial volume of the filter media enclosed in the enclosure, during continued operation of global filtering through filter media outside the enclosure in the filtering system, by generating suction in the upper part of the enclosure that initiates a water flow from the upper part of the enclosure through the pipe system to the discharge structure, wherein the water flow introduces into the lower end of the enclosed partial volume of filter media filtered water from the drainage layer which expands the enclosed filter media and releases sludge therefrom to the water flow, and (v) raising the enclosure above the surface of the filter media to release the backwashed enclosed volume of filter media, by injecting air and increasing air pressure in the upper part of the enclosure to float the enclosure above the filter media.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIG. 1A illustrates schematically a global backwashing apparatus and method in respect to the prior art;

FIG. 1B illustrates schematically a local backwashing apparatus and method in respect to the prior art;

FIGS. 4A-4C schematically illustrate integrated intake and pretreatment units for a water treatment plant with various configurations of the supporting structure for the local backwashing apparatus;

FIGS. 6A and 6B are schematic diagrams illustrating a two-step process for insertion of an enclosure into a filter media, according to one embodiment of the present invention;

DETAILED DESCRIPTION

Figure 2:
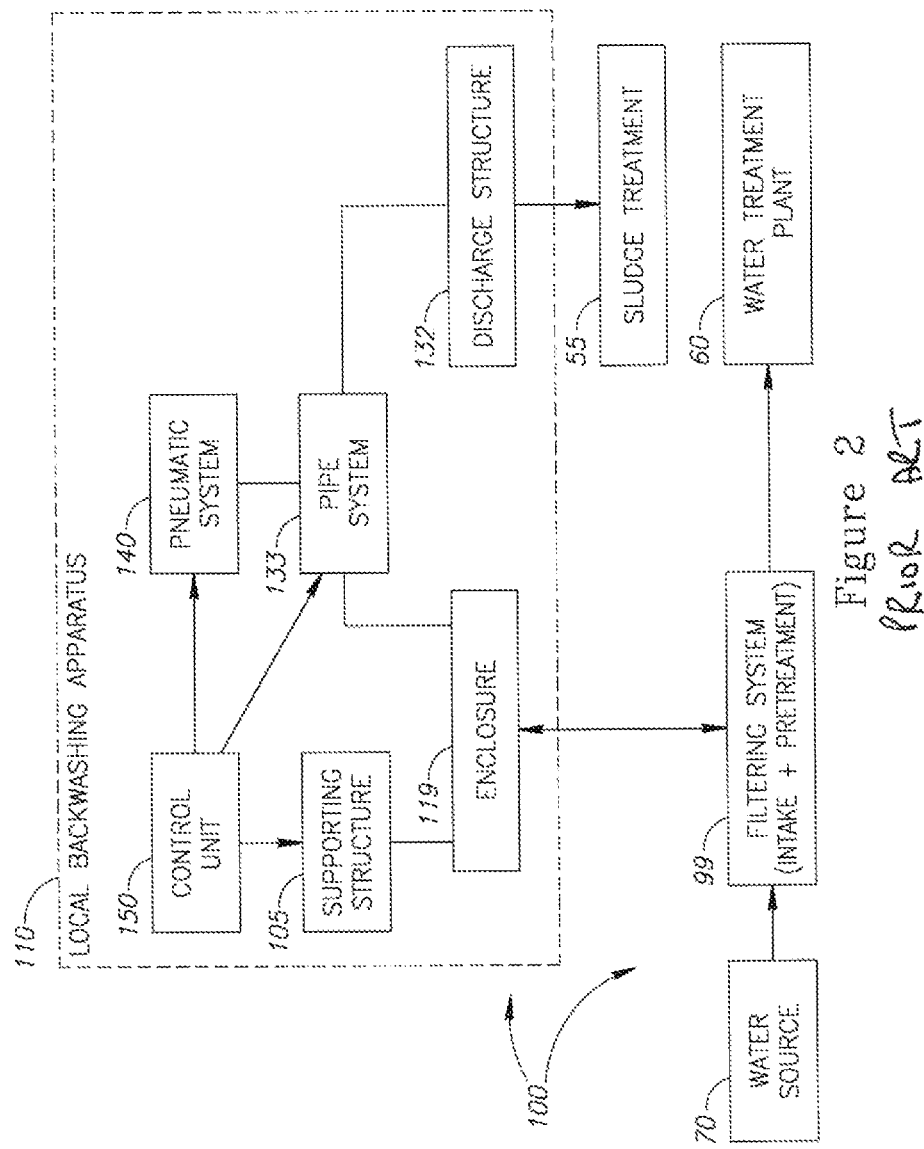
FIG. 2 is a schematic block diagram illustrating an integrated intake and pretreatment unit for a water treatment plant.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways and is limited only by the appended claims. Also, it is to be understood that the phraseology and terminology employed herein is for the purpose of description and should not be regarded as limiting.

The following illustrates a filtering system and an apparatus for performing local or spot backwashing of a water treatment unit (including also water intake units and water pretreatment units) that filters water using a layer of filter media (e.g. sand filter using sand). The apparatus is moved above the surface of the filter media and is inserted at different parts of it consecutively, to eventually backwash the whole volume of the filter media.

The apparatus comprises an enclosure (that may be supported on a bridge, a tower, a crane or a floating platform) that is sunk into the filter media and encloses a portion of it. The enclosure is supported on the draining structure at the base of the filter media. Sinking the enclosure is carried out by lowering the air pressure in its upper part.

Once sunk into the filter media, the lowered air pressure in the upper part of the enclosure is used to initiate suction in the enclosure that expands the enclosed portion of filter media and removes water with sludge from it. The water is supplied into the enclosure from filtered water entering the enclosure from the surrounding filter media outside the enclosure, as the filtration continues globally in the water treatment unit (through filter media outside the enclosure in the filtering system). The enclosure allows a local rise in the water level that does not produce a large head when viewed on the scale of the whole system, and hence does not require massive structural adaptations. Indeed, using local backwashing allows the water level above the filter media to be low, simplifying the construction of the whole system.

After water with sludge is removed, the enclosed portion of filter media is allowed to settle, and the enclosure is raised out of the filter media by increasing the air pressure in its upper part. Upon this increase, the enclosure floats and is moved to another area of the filter.

Several benefits are achieved by using this type of localised backwashing system. The design of the water treatment plant is simplified by using a single filter system which integrates the intake and pretreatment functions instead of having two separate units. The filtering unit has a better design than prior art pretreatment units due to the lower water head that is made possible by the local backwashing apparatus and method and the backwashing process is more efficient, using a much smaller quantity of water, avoiding the use of large external reservoirs of both backwash water and sludge holding wastewater, and allowing the continued operation of the filtering system during the local backwashing. Furthermore, intake of water from the source is made possible without damage to the organisms living in the source, as the filtering system is gentle (no powerful suction but gentle flow through the filter media), and yet in an efficient manner that prevents clogging.

The following drawings illustrate the system and method graphically.

Figures 1A, 1B:
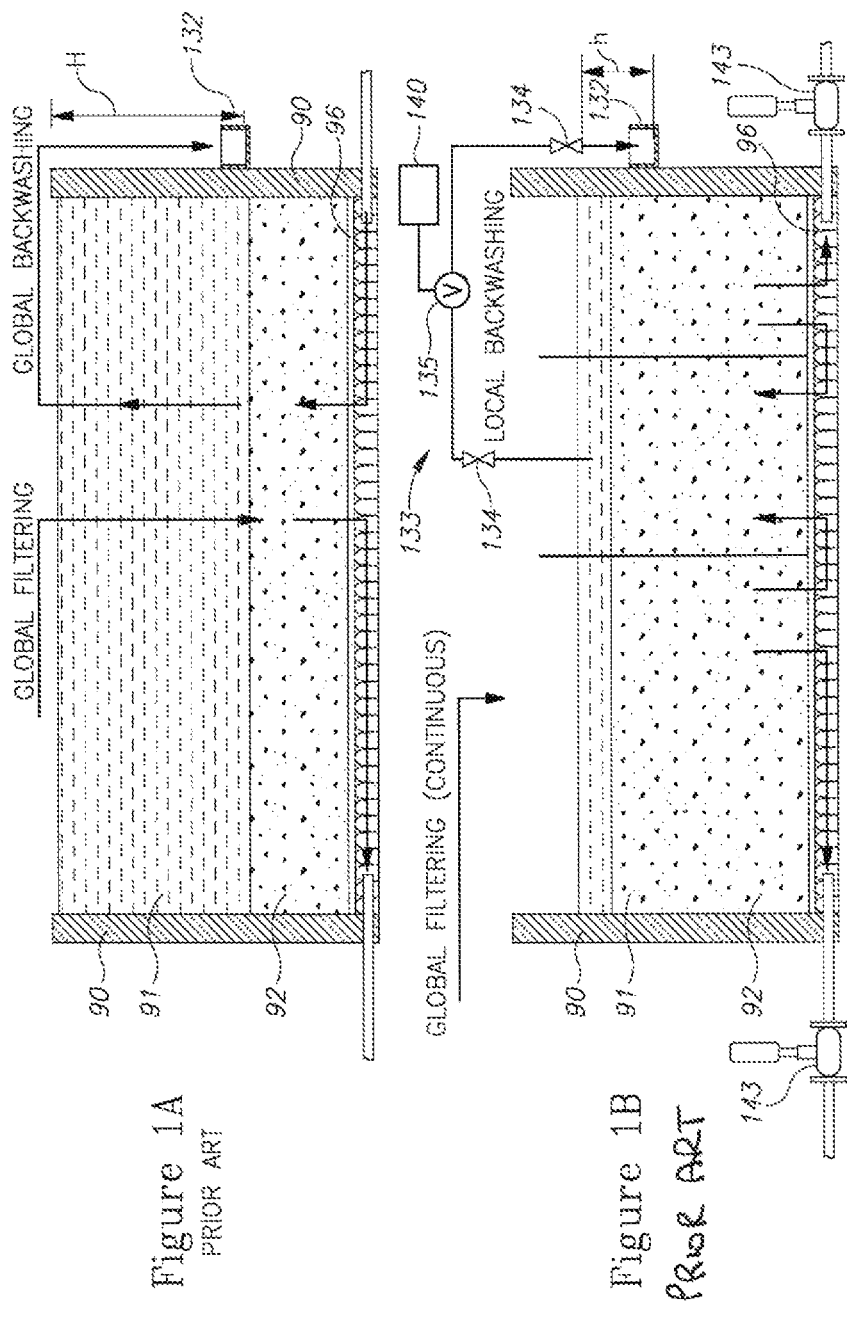

FIG. 1B illustrates schematically the local backwashing apparatus 110 and FIG. 2 is a schematic block diagram illustrating an integrated intake and pretreatment unit 100 for a water treatment plant 60.

Referring to FIG. 2, integrated intake and pretreatment unit 100 comprises a filtering system 99 with a local backwashing apparatus 110 configured to supply water to water treatment plant 60 from a water source 70. For example, water treatment plant 60 may be a desalination plant and water source 70 may be the sea, or water treatment plant 60 may be an osmotic power production plant, receiving seawater via a seawater integrated intake and pretreatment unit 100 and river water via a river integrated intake and pretreatment unit 100, with water source 70 being the sea (or the ocean) and a river, respectively. Water treatment plant 60 may be any other type of facility, for example, drinking ware facilities, irrigation facilities or any other system that removes water from a natural body of water. Water treatment plant 60 operates with water received from integrated intake and pretreatment unit 100 without any further need for pretreatment.

One drawback of the above type of local backwashing is obtaining sufficient penetration of the filter media by the enclosure to create the required suction followed by the necessary movement of the filter bed within the enclosure. Embodiments of the present invention provide a number of improvements over the process and apparatus of the prior art to enhance the efficiency of the local backwashing process.

Local backwashing apparatus 110 for filtering system 99 comprises (FIG. 2) an enclosure 119 for carrying out the local backwashing (see FIGS. 3A-3E), a supporting structure 105 movably supporting enclosure 119, the supporting structure 105 (see FIGS. 4A-4C) configured to position enclosure 119 at a specified spot on the surface, a pneumatic system 140 in fluid communication with an upper part of the enclosure 119 and configured to determine an air pressure in the upper part, a pipe system 133 connecting the upper part of enclosure 119 with pneumatic system 140 and with a discharge structure 132 for receiving wastewater with sludge generated in the local backwashing process, and a control unit 150 connected to supporting structure 105 and pneumatic system 140 and configured to conduct local backwashing of consecutive partial volumes of filter media 92.

As illustrated in FIG. 1B, system 100 and method 200 backwash portions of filter media 92 locally, using much smaller quantities of water. As a consequence, the high level H of water 91 above filter media 92 is not necessary and can be replaced by a much lower level h of water 91 above filter media 92, a fact which significantly simplifies the construction of filter 90. For example, prior art filters are built to allow H=3 meters of water 91 above a 1.5 meter filter media layer 92, while the proposed filter may operate using less than a h=1 meter water layer. As the water level is reduced, pumps 143 are added to move the filtered water through drainage layer 96 to their destination.

Using smaller amounts of backwash water also allows using filtered water instead of water from an external source, and most significantly back wash portions of filter media 92 during the actual filtering process, without interruption to the global process. Using smaller amounts of backwash water also does not require building an external reservoir for receiving the backwash water with sludge for treatment. In principal, discharge channel 132 may be sufficient to handle the backwash water, or sludge may be separated from the water flow and treated separately by a sludge treatment unit 55. Moreover, as backwashing is carried out locally, it does not limit the overall filter size, as global backwashing does. While global backwashing filters are limited to around 100 m2, the proposed filtering system 99 may be built to much larger sizes, for example 500-600 m2.

The actual local backwashing is carried out within a limited portion of filter media 92, e.g. enclosed in enclosure 119 that is expanded to release sludge from the filter media 92. Water with the sludge in is then moved via pipe system 133 to discharge structure 132. The flow of water with sludge may be initiated pneumatically by pneumatic system 140 over a three way valve 135 that prevents the water flow from reaching an air pump (not shown) of pneumatic system 140. The pipe system 133 comprises valves 134 for regulating air and water flow therethrough, as explained below.

FIGS. 3A-3E schematically illustrate the operation of local backwashing apparatus 110 within a filtering system, according to some embodiments of the invention. Local backwashing apparatus 110 for filtering system 99 comprises (FIG. 2) an enclosure 119 having an open lower end and positioned above a surface of filter media of the filtering system, the filter media 92 being supported by a drainage layer.

Enclosure 119 generally comprises an inverted "U" or bell-shaped enclosure having continuous side walls 109 and a roof 111. The base of the side walls converge together to form sharp edges 113 thereby providing a mouth to the enclosure of a smaller cross-section "X" than the cross-section "Y" of the main body of the enclosure. Enclosure 119 may have two main positions—an inactive position 117 and an inserted position 118. In the inactive position 117, an open lower end 128 of enclosure 119 is plunged in water 91 above filter media 92, e.g. on supporting structure 105 such as a bridge or a crane. In inserted position 118, open lower end 128 of enclosure 119 is inserted into filter media 92, enclosing a portion of filter media 92 for backwashing. The sharp edges 113 assist in inserting the enclosure into the filter media and moreover, movement of sand into the enclosure is encouraged due to the larger volume of the main body of the enclosure compared to the smaller area of the mouth. In contrast, with prior art enclosures that have diverging or straight sides provide greater resistance to movement of the sand into the enclosure.

In inserted position 118 enclosure 119 is supported upon drainage layer 96 and isolates the portion of filter media 92 from the surrounding filter media 92. Enclosure 119 is arranged to backwash this portion during the continuing filtration of water 91 in filter 90, as explained below. Pneumatic system 140 is connected to an upper closed end 127 of enclosure 119 and is arranged to determine a pressure in upper closed end 127.

Pneumatic system 140 is connected to upper end 127 and discharge structure 132 via valves 134, 135 that regulate air and water flow to and from enclosure 119. Once water flow is established (priming), it continues due to the hydrostatic pressure difference that results from the difference in water level h between enclosure 119 and discharge structure 132. The regulation of air and water flow is carried out by controlling valves 134, 135 controlled by controlling unit 150. Pneumatic system 140 is further arranged to interrupt the water flow and increase air pressure in upper end 127.

Figure 5:
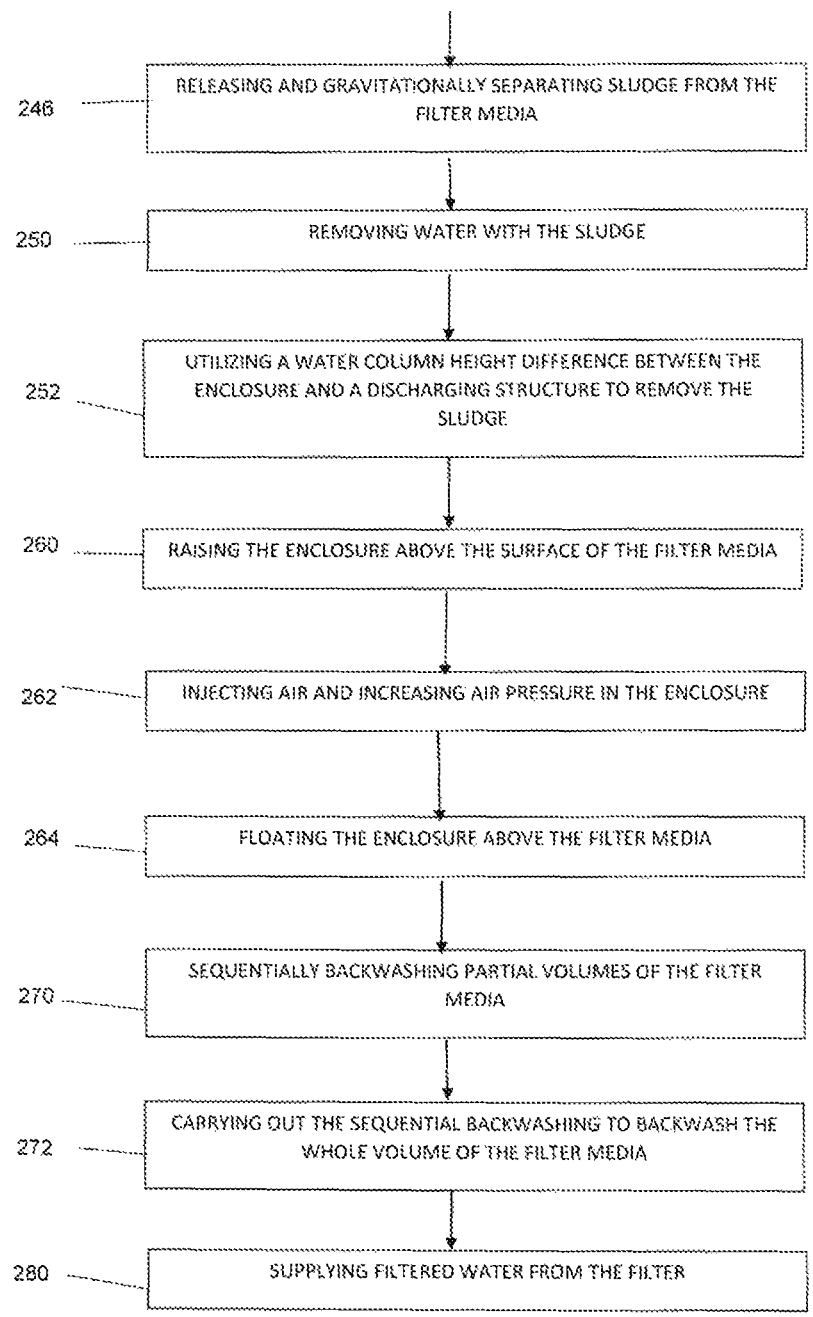
FIG. 5 is a schematic flowchart illustrating a method of supplying a water treatment plant with water and backwashing of the filtering system, according to some embodiments of the invention.

Control system 150 conducts local backwashing of consecutive partial volumes of filter media 92 by the following stages. These stages are also illustrated in FIG. 5, being a schematic flowchart illustrating method 200 of supplying water treatment plant 60 with water and backwashing of filtering system 99, according to some embodiments of the invention.

Figure 3A:
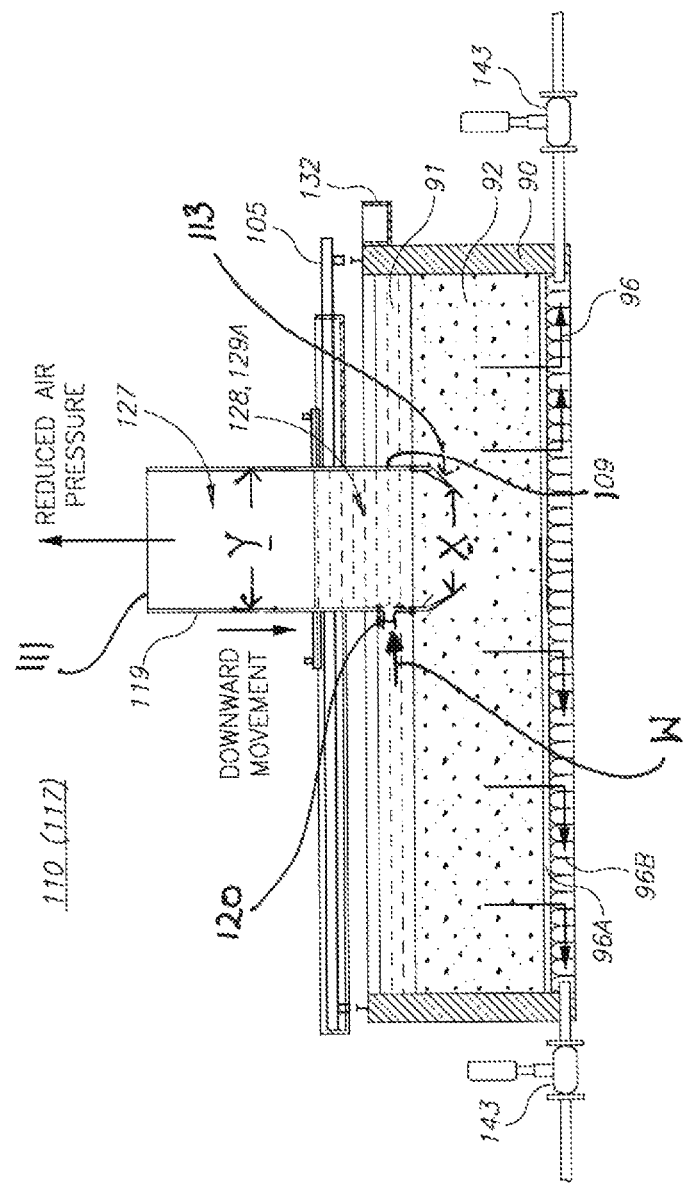
FIGS. 3A-3E schematically illustrate the operation of the local backwashing apparatus within a filtering system, according to some embodiments of the invention.
Figure 3B:
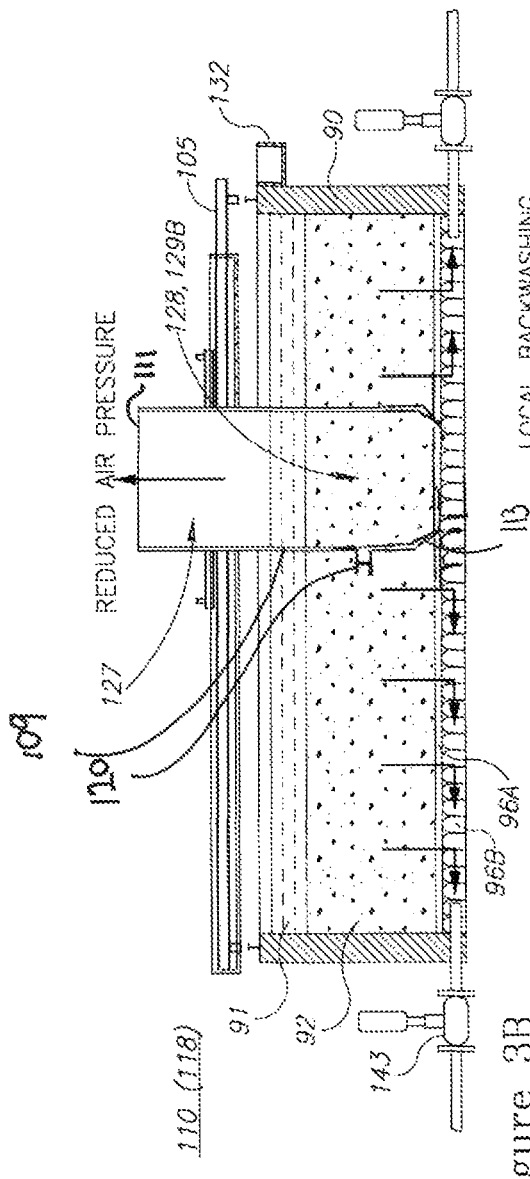
Figure 3C:
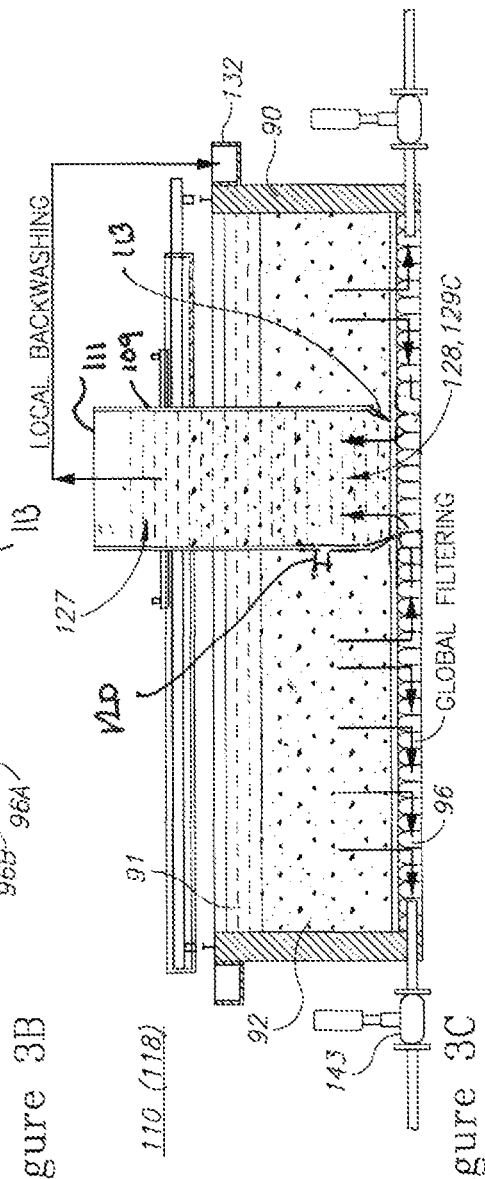
Figures 3D, 3E:
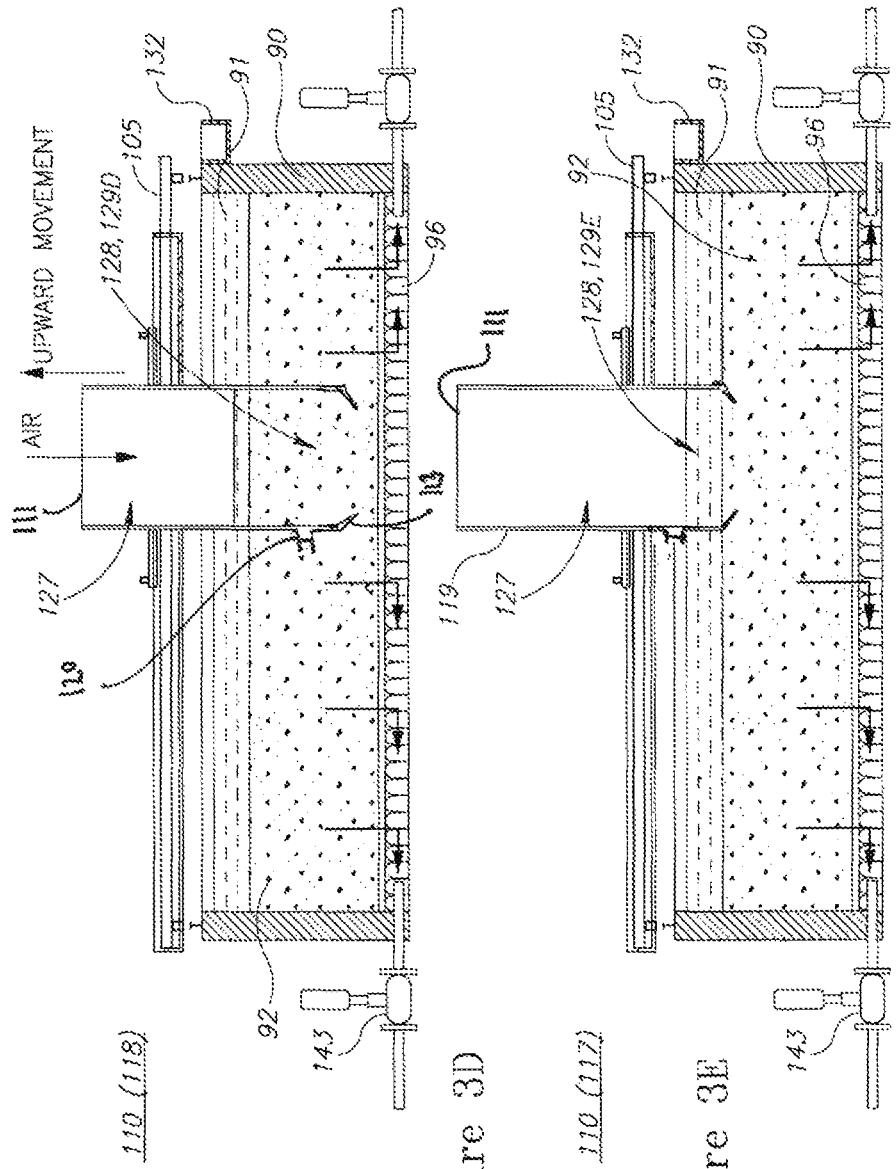

First, enclosure 119 is positioned at a specified spot on the surface that corresponds to the partial volume of filter media, i.e. over the spot that is to be backwashed (stage 225). The positioning may be carried out by lifting enclosure 119 above the surface and then lowering it into the filter media, by dragging or rolling enclosure 119 on the surface, or by any other positioning method. Then (FIG. 3A), enclosure 119 is sunk into filter media 92 (stage 230) until enclosure 119 is supported on drainage layer 96 (FIG. 3B). A water inlet and valve 120 is provided near to the base of the enclosure which is opened during the positioning of the enclosure onto the filter media 92. This assists in embedding the end of the side walls of the enclosure within the filter media. In this respect, the filter media is highly compacted and therefore difficult to cut-through by the walls of the enclosure. The delivery of water to the sand reduces the stickiness of the sand, creating turbulence and encouraging the sand to start flowing up into the enclosure. As this occurs, a vacuum pump is switched on to reduce the air pressure in the upper part 127 of enclosure 119 (stage 232) through pneumatic system 140 once open lower end 128 of enclosure 119 is immersed in filter media 92 (129E in FIG. 3E, representing the end of a former local backwashing process), to enclose the partial volume of filter media 92 within enclosure 119 (stage 234). The water inlet is then gradually closed so water is no longer delivered to the sand. At the beginning of the sinking process, lower end 128 is in the filter media and partially filled with water 129A, at the end of the sinking process, lower end 128 is filled with a local portion of the filtering media 129B. To initiate sinking stage 230, it is favorable that edge 109 is within filter media 92, to prevent excessive water flow that may interfere with the process.

Local backwashing of the partial volume of filter media 92 enclosed in enclosure 119 is then generated during continued operation of global filtering in the filtering system (through filter media outside the enclosure in the filtering system) (stage 240), by generating suction through pneumatic system 140 (stage 242) that initiates a water flow from upper part 127 of enclosure 119 through pipe system 133 to discharge structure 132 (stage 250).

The water flow introduces into the enclosed partial volume of filter media filtered water from drainage layer 96 that is filtered by the rest of the filter media, surrounding enclosure 119 (stage 244) which expands the enclosed filter media and releases sludge therefrom (stage 246) to the water flow that flows to discharge structure 132 (stage 250). Water flow is maintained by utilizing the height difference h between the water level in enclosure 119 (that may locally be higher than the water level in filter 90) (stage 252). An edge 109 (FIG. 3A) of open lower end 128 of enclosure 119 may be shaped to prevent filter media flow into enclosed partial volume 129C (FIG. 3C). As side walls 109 are supported on an upper layer 96A of drainage layer 96 (upper layer 96A of drainage layer 96 supports filter media 92 and allows water move through, a lower layer 96B collects the water), good contact may be achieved. Furthermore, the form of edge 109 may be designed to transmit forces (weight and contacting impact) from enclosure 119 to upper layer 96A in a non-damaging manner. Local backwashing is carried out by water from drainage layer 96 moving into the enclosed filter media, expanding it and removing sludge from the filter media particles. Hence, filtered water that is filtered during the local backwashing by other parts of the filter media outside the enclosure, is used for backwashing the enclosed filter media, without need for an external water source.

Expanded filter media 129C fills most of the volume of enclosure 119, and is agitated due to the suction, water flow into the enclosure and water flow out of the enclosure 119. The agitation separates the sludge particles gravitationally from the filter media, as sludge particles float in the water and filter media sinks. The portion of backwashed filter media may be allowed to settle before enclosure 119 is removed, in order to prevent horizontal mixing of filter media 92 which may decrease the efficiency of the local backwashing.

Finally, enclosure 119 is raised above the surface of filter media 92 (stage 260) to release the backwashed enclosed volume of filter media, by injecting air and increasing air pressure in the upper part of enclosure 119 (stage 262) through the pneumatic system to float enclosure 119 above filter media 92 (stage 264). Settled backwashed filter media 129D starts filtering water 91 at high efficiency once enclosure 119 is removed.

The backwashing of partial volumes may be carried out sequentially (stage 272) to backwash a whole volume of filter media 92 at a frequency between five times a day and once in three months, depending on the sizes of filter 90 and enclosure 119, the clogging rate of the filter media, water throughput, technical parameters of operation, etc. [0035]

Method 200 may further include supplying water treatment plant 60 with water by constructing an intake unit as filtering system 99 (stage 210) with filter media 92 and applying local backwashing (stage 220) to maintain filtering system 99 operative.

Figure 4B:
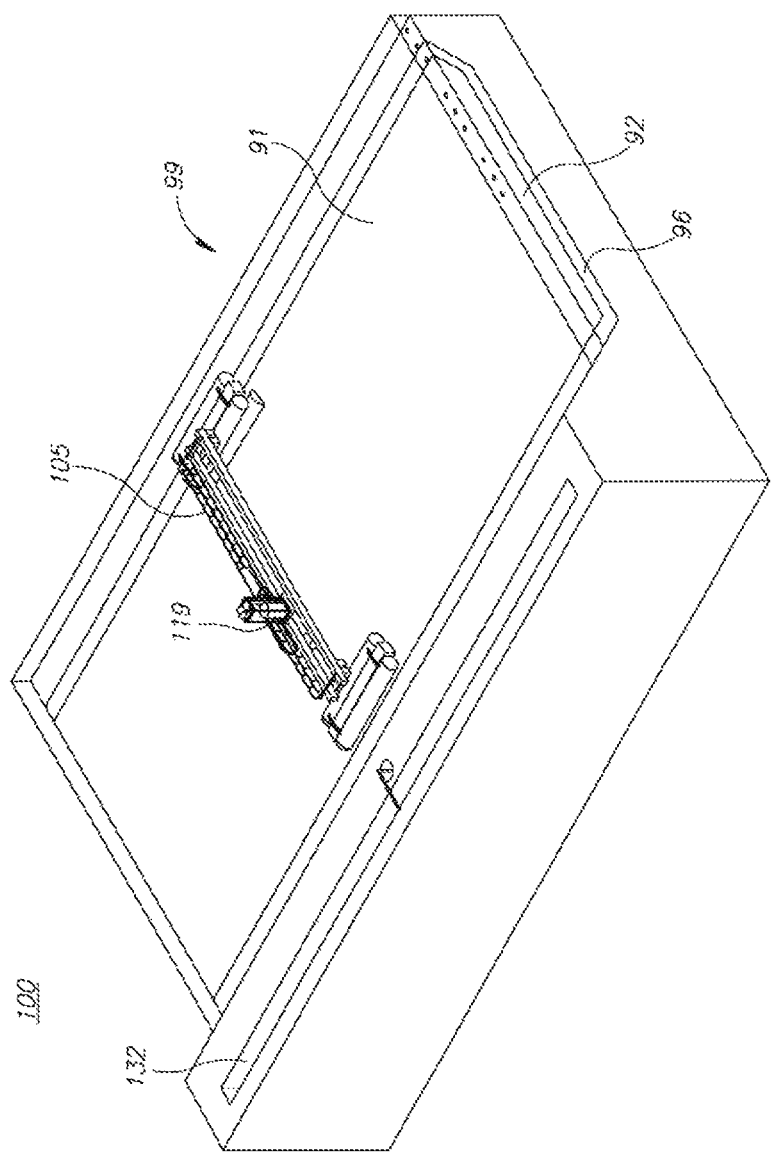
Figure 4C:
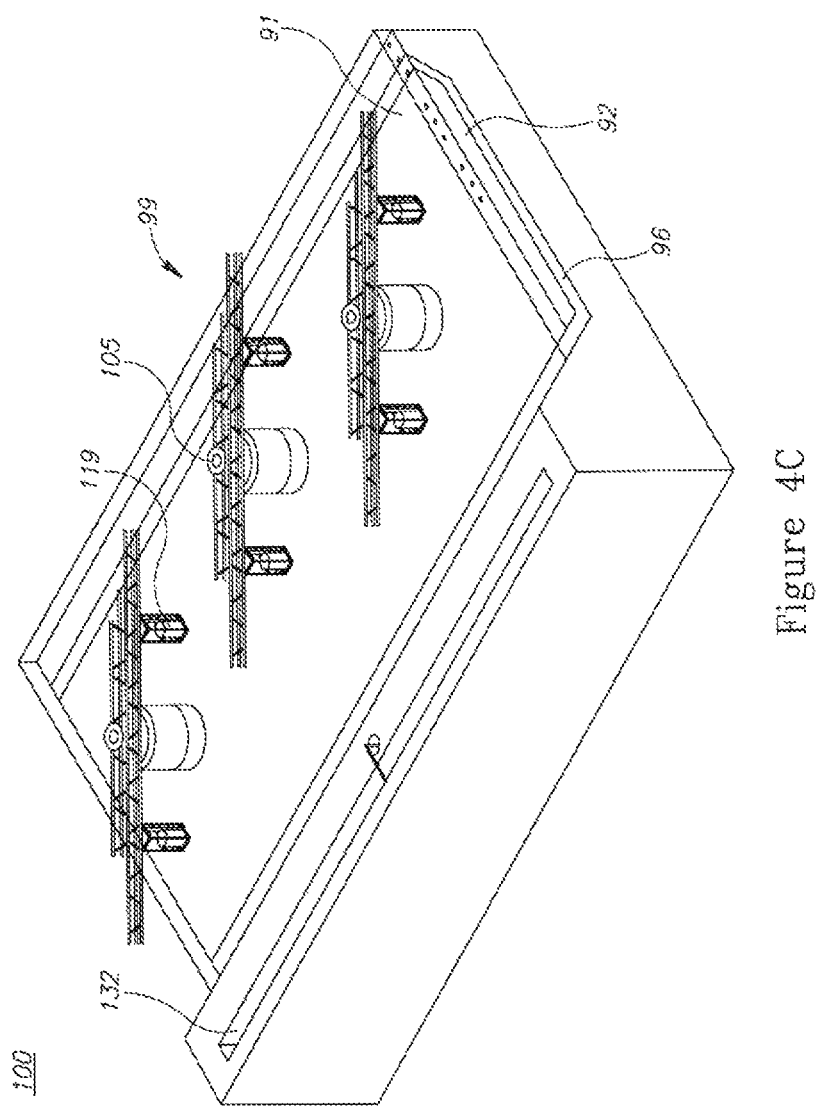

FIGS. 4A-4C schematically illustrate integrated intake and pretreatment units 100 for water treatment plant 60 with various configurations of supporting structure 105 for local backwashing apparatus 110, according to some embodiments of the invention. [0037] FIG. 4A illustrates a concrete filter 90 as filtering system 99 with a fixed bridge as supporting structure 105 (pipe system connecting enclosure 119 to discharge structure is not shown).

FIG. 4B illustrates a constructed filtering system 99 with a floating bridge as supporting structure 105 (pipe system connecting enclosure 119 to discharge structure is not shown). The construction may be carried out e.g. by digging and lining a volume for filter 90 and then bringing filter 90 into contact with water source 70.

FIG. 4C illustrates a constructed filtering system 99 with rotating bridges as supporting structure 105 (pipe system connecting enclosure 119 to discharge structure is not shown). In the illustrated example, enclosures are mounted pairwise on the rotating bridges to achieve a high rate of local backwashing. Multiple enclosures 119 may be used with any configuration of supporting structure 105 and control unit 150 may be adapted to control and manage any number of simultaneously operating enclosures 119. In a similar manner, enclosure 119 may be supported by a crane as supporting structure 105. [0040] In embodiments, filtering system 99 may be elongated and enclosure 119 may span a width of filtering system 99, e.g. have the width of bridges 105 in FIGS. 4A and 4B. In some embodiments, open lower end 128 of enclosure 119 may be small, e.g. have an area between 0.1 m2 and 10 m2 to simplify pipe system 133, pneumatic system 140, supporting structure 105 and their control.

Integrated intake and pretreatment unit 100 prevents damage to the natural fauna in the body of water from where water is taken. As the intake is carried out through the filter media, there are no open pipes or intake screens that damage organisms such as fish, and no open fast flowing water bodies that may remove and kill organisms.

In another embodiment of the present invention, a novel two-step mechanism is incorporated into the method and apparatus to improve the sealing of the enclosure 119 within a subarea of a filter. In this respect, using only mechanical entry for the enclosure may damage the construction of the enclosure and/or the drainage pipes 96 due to the repetitive stress applied when the walls of the enclosure are forced into the filter bed. In the present invention, the enclosure is inserted using a first mechanical step (A) and a second pressure differential step (B), as illustrated in FIGS. 6A and 6B.

A mechanical pusher 300, such as a piston-operated pusher, is used to insert the enclosure the majority of the way into the filter to be enclosed, as illustrated in FIG. 6A. For example, the mechanical pusher may insert the enclosure at least 95% into the filter media 92 but less than 100% into the bed. The enclosure 119 is then moved the remaining distance B (1-10 cm, preferably around 5 cm) by a pressure differential between the inside of the enclosure 119 and the outside of the enclosure which allows the enclosure to gradually close the small gap to the floor of the filter bed, enabling the enclosure to land softly on the floor minimizing damage to both the enclosure 119 and the drainage pipe 96. It is to be appreciated that this two-step mechanism is preferably employed with both converging side walls on the enclosure and the introduction of water into the enclosure thereby greatly enhancing the sealing of the filter bed area within the enclosure, albeit each may be applied separately.

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Embodiments of the invention may include features from different embodiments disclosed above, and embodiments may incorporate elements from other embodiments disclosed above. The disclosure of elements of the invention in the context of a specific embodiment is not to be taken as limiting their used in the specific embodiment alone.

Furthermore, it is to be understood that the invention can be carried out or practiced in various ways and that the invention can be implemented in embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention, as limited by the claims.

What is claimed is:

1. A local backwashing apparatus for a filtering system comprising:
    an enclosure having an open lower end and being positionable above a surface of filter media of the filtering system, the filter media supported by a drainage layer,
    a pneumatic system in fluid communication with an upper part of the enclosure and configured to determine an air pressure in an upper part, the pneumatic system comprising an air pump,
    a pipe system connecting an upper part of the enclosure with the pneumatic system and with a discharge structure, and
    a control unit connected to the pneumatic system, the control unit configured to conduct local backwashing of consecutive partial volumes of the filter media by sinking the enclosure into the filter media until the enclosure is supported on the drainage layer by reducing the air pressure in the upper part of the enclosure through the pneumatic system once the open lower end of the enclosure is immersed in filter media, to enclose the partial volume of filter media within the enclosure and generating local backwashing of the partial volume of the filter media enclosed in the enclosure, during continued operation of global filtering through filter media outside the enclosure in the filtering system, by generating suction through the pneumatic system that initiates a water flow from the upper part of the enclosure through the pipe system to the discharge structure, wherein the water flow introduces into the lower end of the enclosed partial volume of filter media filtered water from the drainage layer which expands the enclosed filter media and releases sludge therefrom to the water flow that flows to the discharge structure, and raising the enclosure above the surface of the filter media to release the backwashed enclosed volume of filter media, by injecting air and increasing air pressure in the upper part of the enclosure through the pneumatic system to float the enclosure above the filter media;

wherein the enclosure comprises side walls with a roof, the free ends of the side walls forming the open lower end of the enclosure, the free ends are connected to the side walls at connection points having a cross-sectional area identical to the cross-sectional area of the upper part of the enclosure, the free ends converging directly from the connection points to provide an open lower end with a smaller cross-sectional area than the upper part of the enclosure.

2. The local backwashing apparatus of claim 1, wherein the apparatus further comprising a supporting structure movably supporting the enclosure, the supporting structure configured to position the enclosure at specified spots on the surface of the filter media.

3. The local backwashing apparatus of claim 2, wherein the supporting structure is at least one of: a fixed bridge, a floating bridge, a rotating bridge and a crane.

4. The local backwashing apparatus of claim 1, wherein a height of the enclosure is taller than a height of the water above the filter media.

5. The local backwashing apparatus of claim 1, wherein the pneumatic system is connected to a vacuum pump, and wherein the vacuum pump achieves the reduction of the air pressure in the upper part of the enclosure through the pneumatic system.

6. The local backwashing apparatus of claim 1, wherein the control system controls movement of the enclosure.

7. The local backwashing apparatus of claim 1, wherein the control system is capable of sequentially backwashing a whole volume of filter media in the enclosure at a frequency of between five times a day and once in three months.

8. An integrated intake and pre-treatment unit of a water treatment plant, the integrated intake and pre-treatment unit comprising a filtering system with the local backwashing apparatus of claim 1.

9. The integrated intake and pre-treatment unit of claim 8, wherein the integrated intake and pre-treatment unit receives water from a water source, treats the water to generate treated water, and sends the treated water to the water treatment plant.

10. The integrated intake and pre-treatment unit of claim 8, wherein the integrated intake and pre-treatment unit is configured to supply water to the water treatment plant.

11. The integrated intake and pre-treatment unit of claim 10, wherein the water treatment plant operates with the water supplied from the integrated intake and pre-treatment unit without needing to further pre-treat the water.

12. The local backwashing apparatus of claim 1, wherein the enclosure is connected to a mechanical member configured to drive the enclosure into the filter media and release said force prior to contact of the lower end of the enclosure with the drainage layer.

13. The local backwashing apparatus of claim 12, wherein the lower end of the enclosure is brought into contact with the drainage layer through a pressure differential between the interior and exterior of the enclosure.

* * * * *